US007003890B2

(12) United States Patent
Kavounas

(10) Patent No.: US 7,003,890 B2
(45) Date of Patent: Feb. 28, 2006

(54) WALL REFLECTORS FOR ALIGNING LASER BEAMS AND METHODS OF USING THEM

(76) Inventor: Gregory T. Kavounas, 11410 NE. 124th St., #216, Kirkland, WA (US) 98034

( * ) Notice: Subject to any disclaimer, the term of this patent is extended or adjusted under 35 U.S.C. 154(b) by 33 days.

(21) Appl. No.: 10/868,096

(22) Filed: Jun. 14, 2004

(65) Prior Publication Data

US 2005/0274029 A1 Dec. 15, 2005

(51) Int. Cl.
*G01C 15/00* (2006.01)

(52) U.S. Cl. .................................. 33/286; 33/DIG. 21

(58) Field of Classification Search .................. 33/286, 33/1 G, 227, 228, 276, 277, DIG. 21
See application file for complete search history.

(56) References Cited

U.S. PATENT DOCUMENTS 5,063,679 A * 11/1991 Schwandt .................... 33/370
5,673,492 A * 10/1997 Williams ..................... 33/286
5,912,736 A * 6/1999 Marcuse et al. ............ 356/505
6,694,630 B1 * 2/2004 Dang et al. .................... 33/286
6,891,148 B1 * 5/2005 Rivera et al. ................. 33/276

* cited by examiner

*Primary Examiner*—Christopher W. Fulton
(74) *Attorney, Agent, or Firm*—Gregory T. Kavounas

(57) ABSTRACT

Wall reflectors work in conjunction with devices that emit wall laser beams, for assisting the attachment on a wall of items such as pictures. The wall reflectors are constructed to be attached on the wall, and to provide surfaces for reflecting the laser light beam into rays. Multiple wall reflectors can optionally also provide a whole pattern on the wall, such as a grid.

39 Claims, 8 Drawing Sheets

1440

1410 SITUATE LASER LIGHT SOURCE TO EMIT BEAM

↓

1420 ATTACH WALL REFLECTOR ON WALL IN THE WAY OF BEAM TO GENERATE REFLECTED (AND TRANSMITTED) RAY(S)

↓

1430 ADJUST (E.G. LEVEL) WALL REFLECTOR

↓

1440 PLACE ADDITIONAL REFLECTOR SO AS TO RECEIVE RAY

↓

1450 ATTACH ITEM(S) ON WALL AS GUIDED BY RAY(S)

WALL REFLECTORS FOR ALIGNING LASER BEAMS AND METHODS OF USING THEM

BACKGROUND

1. Field of the Invention

The present invention is related to the field of home improvement, and more specifically to devices and methods for assisting the attachment of items on walls, such as pictures, tiles, and so on.

2. Description of the Related Art

When people attach items on the wall, such as pictures, tiles, etc., they try to place them so that they are level, and/or aligned with each other. A device recently introduced to facilitate such attaching is now described.

FIG. 1 shows a laser device 60 that can output a visible laser beam 62. Device 60 is usually provided with means such as adhesive tape (not shown), for attachment to the wall. The attachment means must be strong enough to support laser device 60 on the wall, without otherwise support for its weight from underneath.

Device 60 also includes two embedded levels, a vertical level 64, and a horizontal level 66. Levels 64 and 66 are used for leveling device 60, when attaching it on the wall. This way, beam 62 can also be aligned along the vertical or the horizontal.

When device 60 is so attached to a wall, beam 62 is substantially parallel to the wall, and is also called a wall laser beam. Being aligned along the vertical or the horizontal, beam 62 therefore provides a reference for aligning an item on the wall.

Attempts have been made to reduce the weight of device 60. Their effectiveness is limited by the fact that device 60 needs to include a battery.

A problem arises when it is desired to obtain multiple wall laser beams, such as for attaching multiple items on the wall. In one instance, all beams need to be present concurrently, for example for forming a pattern. In that case, a different light source must be used for each wall laser beam of the grid, and such light sources are expensive. In another instance, not all beams need to be present concurrently. An example is now described.

FIG. 2 shows how laser device 60 is to be used on a wall 80 for placing tiles 82. Laser 60 must be successively placed at, and then removed from, from multiple places 68. This way beam 62 each time provides a level reference for each new row of tiles 82. Multiple attaching and detaching wears out the attachment means, which can cause laser device 60 to drift while attached.

BRIEF SUMMARY

The present invention overcomes these problems and limitations of the prior art.

Generally, the present invention provides special devices called wall reflectors, which are constructed to be attached on a wall, and be used together with a laser light source. A wall reflector provides an at least partially reflective surface for reflecting laser light, which in some embodiments is oriented at 45° from the vertical or the horizontal.

The present invention also provides methods for using one or more wall reflectors. A laser source is situated such that it emits a wall laser beam. A wall reflector is attached on the wall such that it receives the beam, and reflects it to provide a ray at a different angle than the beam. The beam could be horizontal, and the ray could be vertical. The ray can be used to align the item for attaching.

In some embodiments, the wall reflector also provides a transmitted ray, and also possibly a group of other partially reflected and partially transmitted rays. Additional wall reflectors can be placed to receive any one of the rays, for generating a whole pattern, such as a grid.

The invention offers the advantage that only one laser light source need be used for an entire pattern of rays. While the single source provides only one beam, the remainder of the pattern can be formed by rays from the wall reflectors. The latter include only passive optics, and therefore they are far more economical than the laser sources, while also being lighter and thus easier to support on the wall than laser devices.

The invention also offers the advantage that the laser light source needs to include only one level, not two. Indeed, the laser light source could emit only in the horizontal direction for example, and the wall reflectors will derive rays aligned with the other direction. This way, the laser light source can be manufactured more economically.

The invention additionally offers the unexpected advantage that the laser light source need not be attached to the wall. Indeed, it can be situated on the floor, such as on its own base, as long as it provides a horizontal beam near the wall. Wall reflectors can transfer the beam in stages, to deliver at least one ray at the desired location. Accordingly, the laser light source need not have attachment means for attaching to the wall, and may be made more economically this way. And even the horizontal level might not be needed, if the floor itself is assumed level.

The invention will become more readily apparent from the following Detailed Description, which proceeds with reference to the drawings, in which:

DETAILED DESCRIPTION

As has been mentioned, the present invention provides wall reflectors for reflecting light of a wall laser beam into rays of different directions. The invention also provides methods of using one or more such wall reflectors, so as to form a pattern of rays from a single beam, such as a beam. The invention is now described in more detail.

Figure 3:
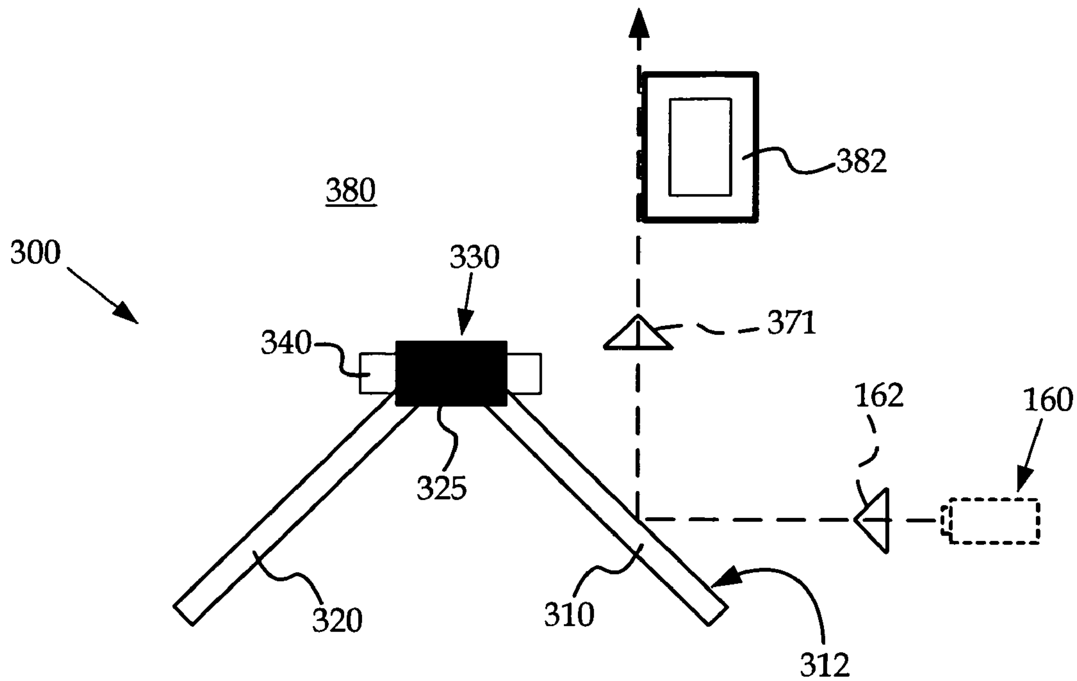
FIG. 3 is a diagram of at least a portion of a wall reflector according to an embodiment of the present invention.

FIG. 3 is a diagram of at least a portion of a wall reflector 300, made according to an embodiment of the invention. Other portions of wall reflector 300 may be added as needed and/or as explained below, and as will become apparent to a person skilled in the art in view of the present description.

Reflector 300 is described in the context of being used for a wall 380, on which a picture 382 is to be hung. A laser light source 160 provides a wall beam 162. Laser light source 160 may or may not be made as the previously described light source device 60. In fact, as it will be seen, in some embodiments, source 160 does not include one or even both of the levels of source 60, and may not even need to be attached to wall 380.

Reflector 300 includes a structure 330 suitable for attachment on a surface of vertical wall 380. Structure 330 includes a redirecting member 310, which includes a substantially flat redirecting surface 312. Attaching structure 330 to wall 380 is preferably such that a plane of surface 312 is substantially perpendicular to a plane of the surface of wall 380. Surface 312 is adapted to reflect laser light at least partially.

In the embodiment of FIG. 3, structure 330 includes an additional member 320, which is sometimes known as an exit member 320. As will be elaborated in more detail below, exit member 320 may perform one or more functions, such as balancing, being an exit member for a ray, and so on. To accomplish balancing, exit member 320 is made substantially identically to redirecting member 310.

Structure 330 also includes a connector 325, which connects member 310 with member 320. Connector 325 need not always be provided, such as in embodiments where member 310 is provided integrally with member 320.

Reflector 300 is placed such that it receives wall beam 162 at surface 312. Accordingly, reflector 300 generates a ray 371, by reflecting wall beam 162. Ray 371 may be used to align picture 382 for hanging on wall 380.

In some embodiments, reflector 300 further includes attachment means for attaching structure 330 to the wall. Any suitable attachment means may be used, such as an adhesive strip 340. Attachment is such that a plane of redirecting surface 312 is oriented at approximately 45° from a vertical plane.

Further, surface 312 is either fully or partially reflecting. If only partially reflecting, it may also be partially transmitting. If it is both, member 310 may be made from glass, plastic, or other transparent material. Good quality glass will keep down scattering from points inside the bulk of member 310, which may be a problem since laser light is bright.

A coating may be applied to surface 312 for various purposes. One such purpose is reflectivity. Another may be to take advantage of different polarizations, given that laser light is often provided in polarized form. If surface 312 is to be only reflecting, the coating may be metallic and so on.

Figure 4:
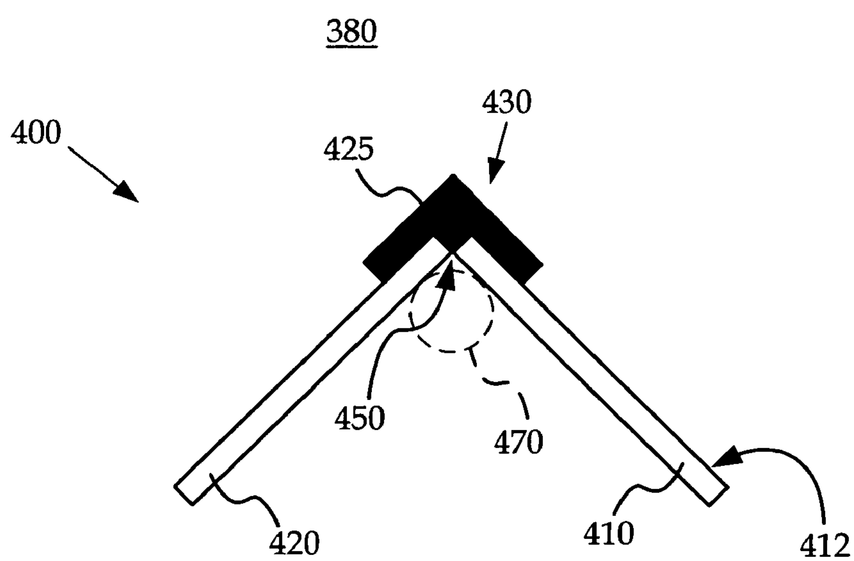
FIG. 4 is a diagram of at least a portion of a wall reflector according to another embodiment of the present invention.

FIG. 4 is a diagram of at least a portion of a wall reflector 400, made according to another embodiment of the invention. Reflector 400 includes many components similar to those of reflector 300. In particular, a structure 430 is included, along with a redirecting member 410 and an exit member 420.

Structure 430 defines a support location 450. In this embodiment, support location 450 is the inside corner of where redirecting member 410 meets with exit member 420.

A support member 470, such as a nail, a pin, a pushpin, a thumbtack and the like, may be partially inserted in the surface of wall 380. Structure 430 may be attached to wall 380 by being supported at support location 450 on support member 470.

Additionally, structure 430 is balanced such that, when it is supported on pushpin 470, a plane of redirecting surface 412 is oriented at approximately 45° from a vertical plane. The specific implementation of support location 450 permits structure 430 to be slight rotated for final adjustment.

Figure 5:
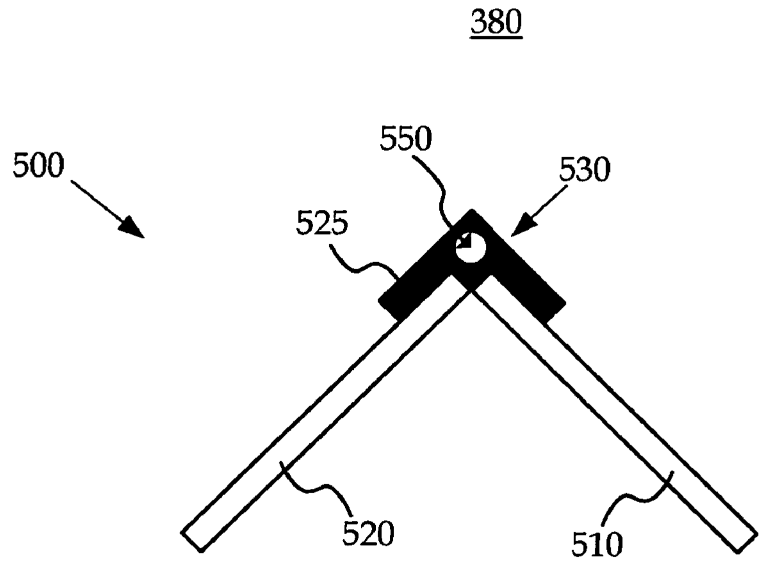
FIG. 5 is a diagram of at least a portion of a wall reflector according to yet another embodiment of the present invention.

FIG. 5 is a diagram of at least a portion of a wall reflector 500, made according to yet another embodiment of the present invention. Reflector 500 includes many components similar to those of reflector 400. In particular, a structure 530 is provided, which includes a redirecting member 510, an exit member 520, and a connector 525 connecting redirecting member 510 with exit member 520.

Structure 530 defines a support opening 550 that functions as a support location. Attaching is by placing reflector 500 such that a nail (or other support member, not shown) is received in support opening 550. In other words, reflector 500 is hung on wall 380 from support opening 550.

The diagrams of FIG. 3, FIG. 4, FIG. 5 are not intended to show a complete device by itself, but shows major important features of the invention. It will be recognized that subsequently described embodiments also include many features described with reference to these diagrams. For example, a wall reflector according to the invention may include components additional to what is shown.

Figure 6:
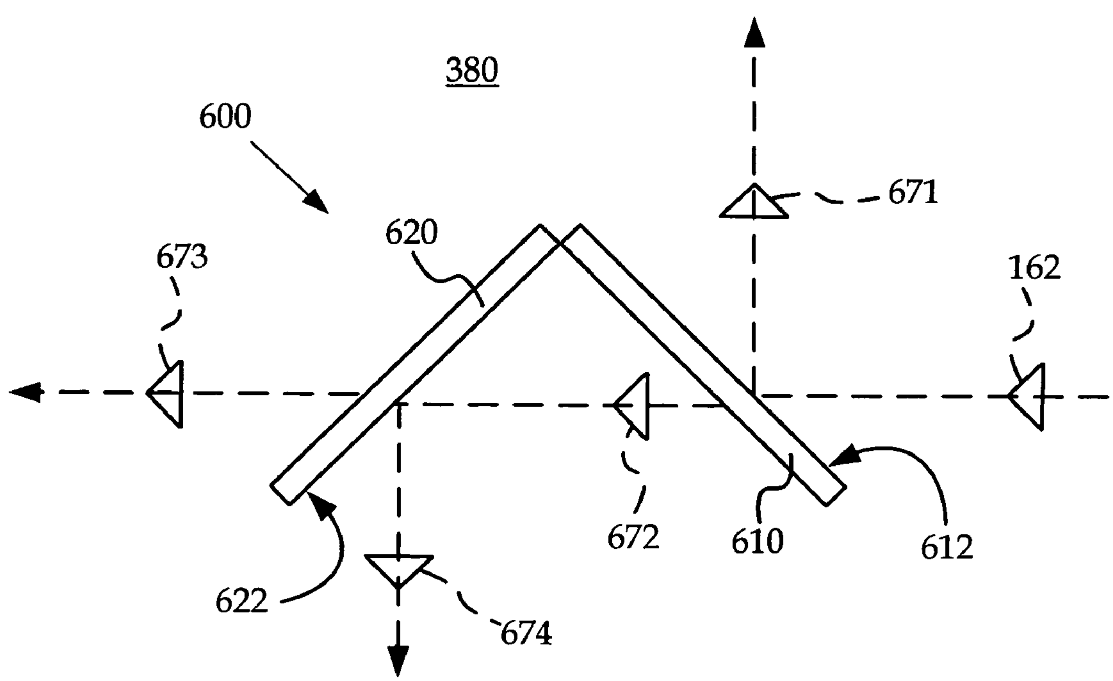
FIG. 6 is a diagram of optical surfaces for tracing rays at a portion of a wall reflector according to embodiments of the present invention.

FIG. 6 is a diagram of optical surfaces of a wall reflector 600 according to embodiments of the present invention, for purposes of describing generation of rays from an incident wall laser beam 162. It will be recognized that the optical surfaces of wall reflector 600 may be part of the above described reflectors 300, 400, 500, and also of later described reflectors.

Reflector 600 includes a redirecting member 610 and an exit member 620. While their spatial relationship is important, their manner of attachment can be any suitable such manner. Such manners have been described above, and are not described or shown in FIG. 6.

Reflector 600 receives a wall laser beam 162 at a redirecting surface 612. Redirecting member 610 and redirecting surface 612 are adapted to also transmit incident laser light beam 162 at least partially. Accordingly, while generating reflected ray 671, reflector 600 also generates transmitted ray 672.

Transmitted ray 672 is received by an exit surface 622 of exit member 620. Exit member 620 and exit surface 622 are adapted to both reflect and transmit light that is received, such as ray 672. Accordingly, from ray 672, there is a transmitted ray 673, and a reflected ray 674.

It is preferred that exit member 620 is oriented at right angles to redirecting member 610. If that is the case, ray 674 will be parallel to ray 671, but traveling in the opposite direction.

Redirecting member 610 and exit member 620 may have dimensions similar to those of microscope slides. In fact, actual microscope slides tend to be made from good quality glass that is rather clear, as is preferred.

Further, if it is desired to suppress rays 673, 674, a stop may be placed on either redirecting member 610 or exit member 620, so that they do not allow light through. The stop need not be large, because it is intended for blocking a beam or ray, not diffuse light. Further, if wall reflector 600 is balanced on a support member, it is also preferred that the stop be small, so that it does not upset the balance.

Aligning the wall reflectors of the invention with the vertical or the horizontal may be performed in a number of ways according to the invention. One such way is by using a guiding surface, as is described with reference to FIG. 7 and FIG. 8. Another such way is by using a level, as is described with reference to FIG. 9. Other ways are also possible by exploiting features of the wall reflector, along with the nature of propagation and reflection of light, such as is described with reference to FIG. 12A and FIG. 12B.

Figure 7:
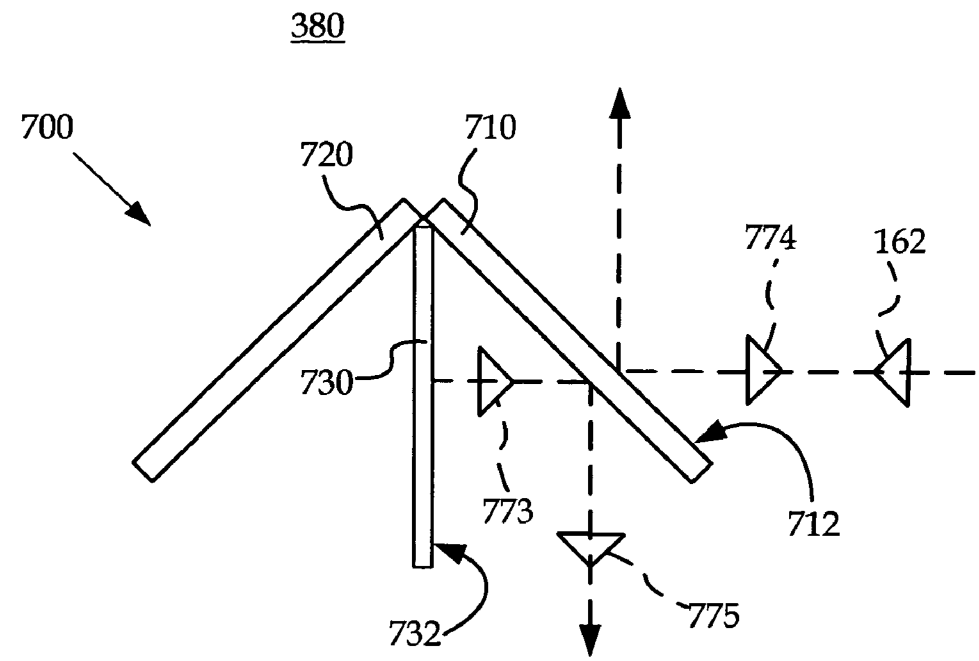
FIG. 7 is a diagram of at least a portion of a wall reflector according to yet another embodiment of the present invention.

FIG. 7 is a diagram of at least a portion of a wall reflector 700, made according to yet another embodiment of the invention. Reflector 700 includes a redirecting member 710, an exit member 720, and a guiding member 730, which includes a substantially flat guiding surface 732 for leveling.

Surface 732 is reflective, and when it receives beam 162 through the redirecting member 710, it reflects it back as ray 773. So, the whole reflector 700 may be adjusted such that ray 773 is transmitted through redirecting member 710 as ray 774, and falls back onto laser light source 160. In addition, since redirecting member 710 transmits partially and also reflects partially, a portion of ray 773 will also be reflected as ray 775.

In the preferred embodiment, a plane of guiding surface 732 is approximately 45° from the plane of redirecting surface 712 of the redirecting member 710. In this case, guiding surface 732 is vertical, when reflector 700 is attached to the wall. Accordingly, this adjustment will ensure that wall reflector 700 is also properly leveled, by using incident wall beam 162 as a reference, and exploiting the fact that the reference is assumed to be level with the horizontal in the first place.

Member 730 and surface 732 may be either totally reflective, or partially reflective and partially transmissive. In the latter case, they may be made advantageously from a material similar to that of redirecting member 710 and its redirecting surface 712, respectively.

Figure 8:
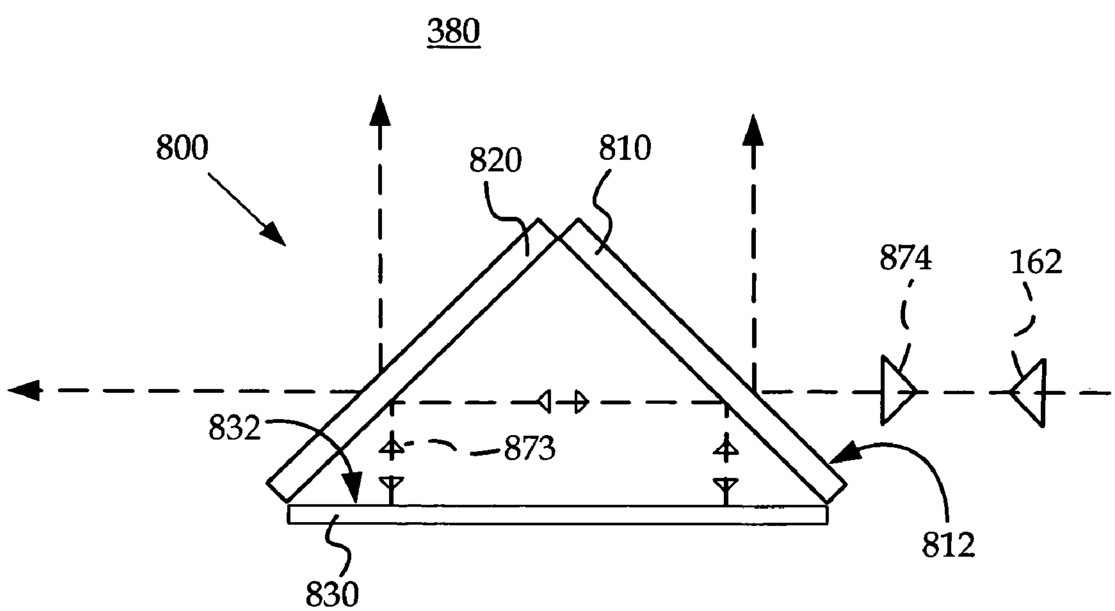
FIG. 8 is a diagram of at least a portion of a wall reflector according to one more embodiment of the present invention.

FIG. 8 is a diagram of at least a portion of a wall reflector 800, made according to yet another embodiment of the invention. Reflector 800 includes a redirecting member 810, an exit member 820, and a guiding member 830, which includes a substantially flat guiding surface 832 for leveling. A plane of guiding surface 832 is approximately 45° from the plane of redirecting surface 812, but in this case, guiding surface 832 is horizontal, when reflector 800 is attached to the wall.

Surface 832 is reflective, and when it receives beam 162 through the redirecting member 810 and by reflection on exit member 820, it reflects it back as ray 873. So, the whole reflector 800 may be adjusted such that ray 873 is reflected again on exit member 820, emerges past redirecting member 810 as ray 874, and falls back onto laser light source 160. This adjustment will ensure that wall reflector 800 is also properly leveled, by using incident wall beam 162 as a reference.

Figure 9:
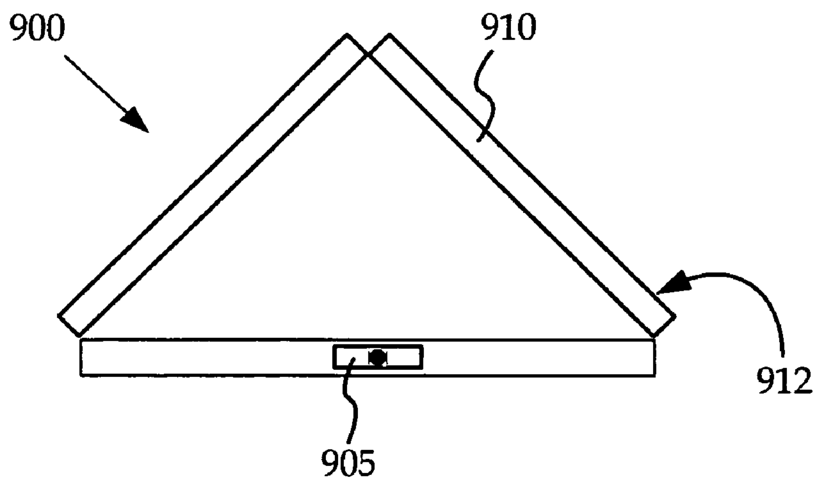
FIG. 9 is a diagram of at least a portion of a wall reflector that further includes a level according to another embodiment of the present invention.

FIG. 9 is a diagram of at least a portion of a wall reflector 900, made according to another embodiment of the invention. Reflector 900 includes a redirecting member 910 with a redirecting surface 912, and a level 905. Level 905 is coupled to redirecting member 910, directly or indirectly, through the structure of reflector 900. Level 905 can be used for leveling reflector 900, without needing a guiding surface of the type shown in FIG. 7 and FIG. 8, or needing to assume that an incident wall laser beam is itself level with the horizontal or the vertical.

Figure 10:
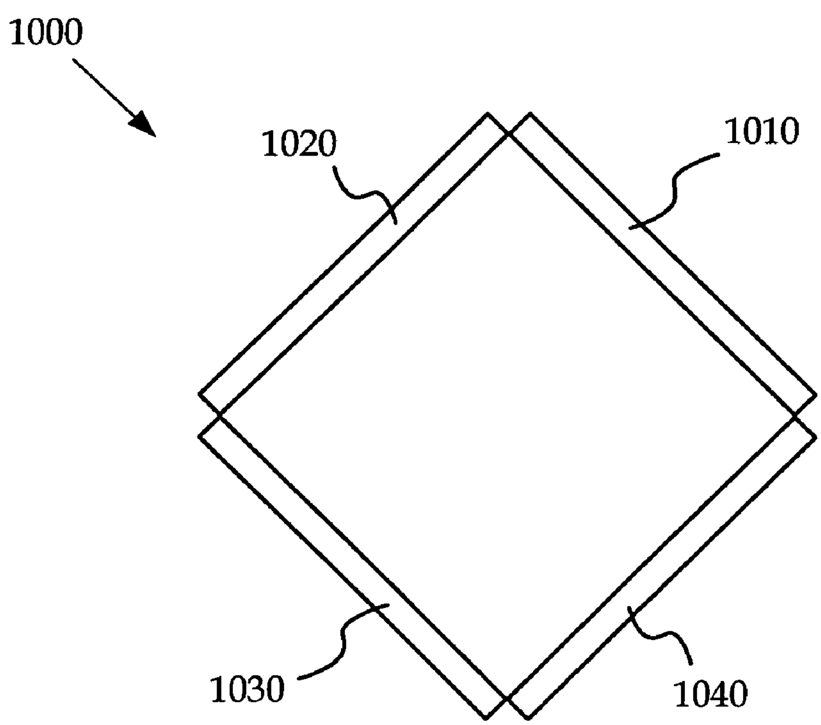
FIG. 10 is a diagram of optical surfaces of a wall reflector according to an additional embodiment of the present invention.

FIG. 10 is a diagram of optical surfaces of a wall reflector 1000, made according to an additional embodiment of the invention. Reflector 1000 includes members 1010, 1020, 1030, 1040, which present optical surfaces, and are arranged substantially as a rectangle, and preferably a square.

As will be understood, an important aspect of reflector 1000 is the spatial relationship of members 1010, 1020, 1030, 1040 with respect to each other. In some embodiments, members 1010, 1020, 1030, 1040 are held together in the shown relationship by structure that may include one or more connectors (not shown).

In the embodiment of FIG. 10, each one of members 1010, 1020, 1030, 1040 is partially reflective and partially transmissive. As will be seen, all members 1010, 1020, 1030, 1040 perform a redirecting function and an exiting function. It is important that each member has sides that are parallel to each other, so that a transmitted ray emerges parallel to the incident beam.

Figure 11:
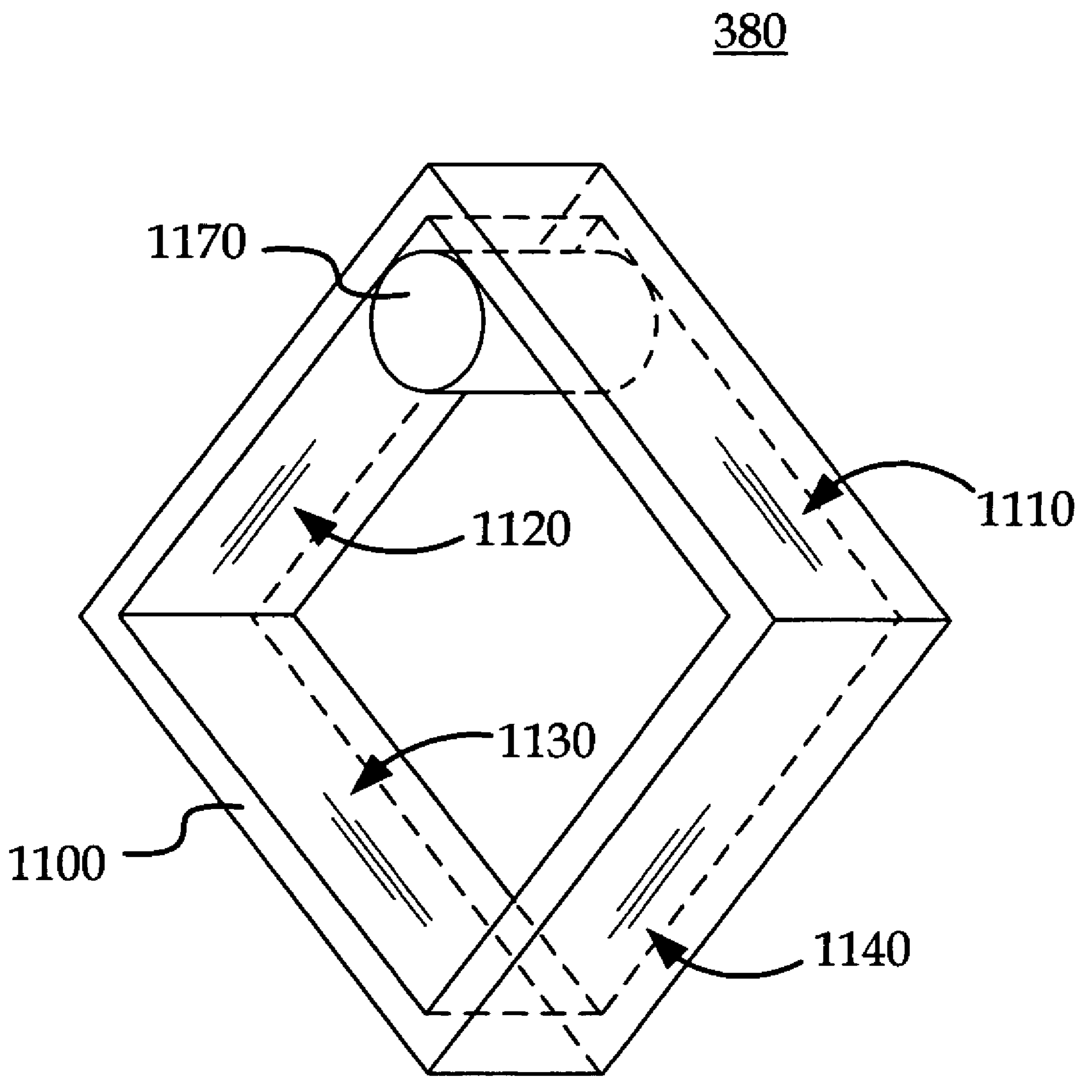
FIG. 11 is a perspective diagram of a wall reflector having the optical surfaces of FIG. 10 according to the preferred embodiment of the present invention.

FIG. 11 is a diagram of a wall reflector 1100 having the optical surfaces of FIG. 10, and made according to the preferred embodiment of the present invention. Wall reflector 1100 is made from a single piece of transparent material, such as plastic. The piece has members 1110, 1120, 1130, 1140 that present surfaces, which are partially reflective and partially transmissive. Each one of these members may be ½" wide, 1" to 2" long, and as thin as practicable.

Wall reflector 1100 is shown attached to wall 380 by being suspended from a thumbtack 1070 partially inserted into wall 380. In this case, a support location is defined in the inside corner where any two neighboring ones of members 1110, 1120, 1130, 1140 meet.

If too many rays result, a stop can be placed as per the above. In some instances, two stops may be used, to preserve the balance. In addition, the angular adjustment of reflector 1100 may be preserved due to friction against wall 380.

Figure 12A:
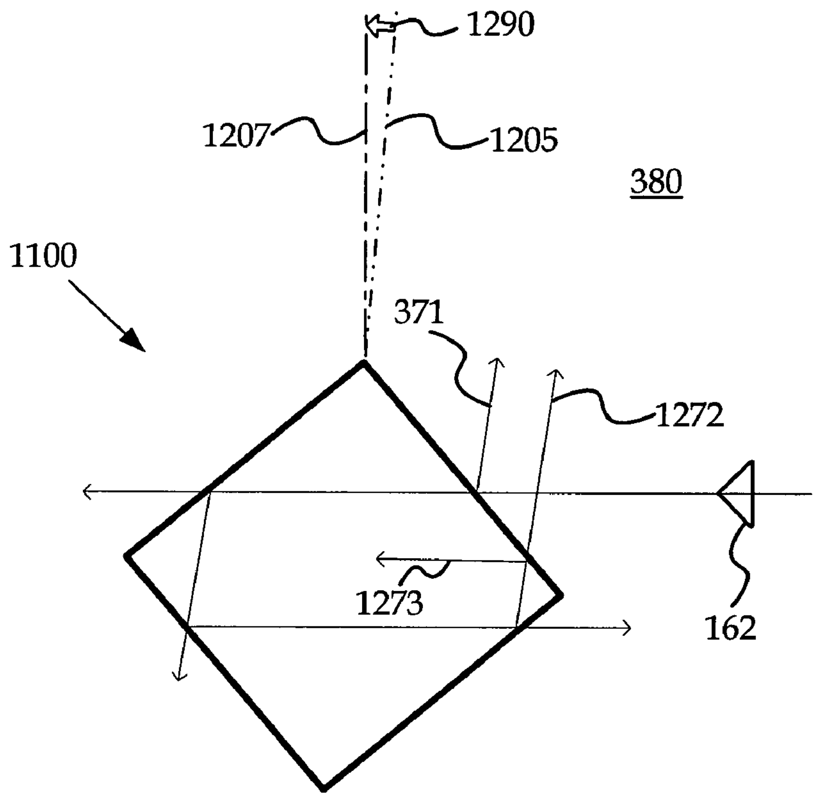
FIG. 12A and FIG. 12B are diagrams illustrating successive positions while the wall reflector of FIG. 11 is being adjusted.
Figure 12B:
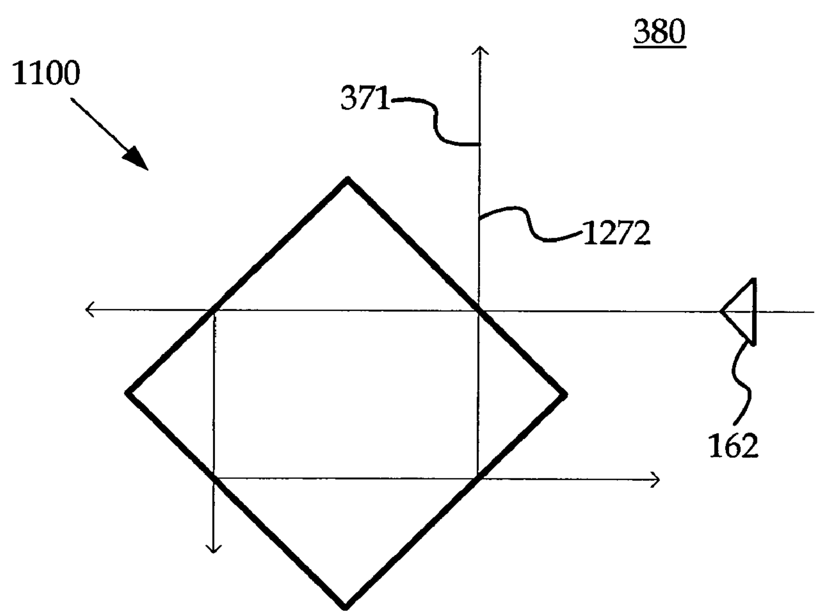

FIG. 12A and FIG. 12B are diagrams illustrating successive positions of wall reflector 1000, while it is being adjusted.

In FIG. 12A, reflector 1100 is misaligned. A diagonal 1205 of reflector 1100 is at an angle from a vertical line 1207. As a result from incident beam 162, which is horizontally level, two rays 371 and 1272 emerge from the same side of reflector 1100, which do not coincide. In addition, many other rays are created, as ray 1273 reflects from more and more of the surfaces of reflector 1100. Each reflection generates a reflected and a transmitted ray, with many of the transmitted rays exiting reflector 1100 from different places of the same face.

Adjustment is according to arrow 1290, which brings reflector 1100 in such a position that diagonal 1205 coincides with vertical line 1207. As adjustment takes place, rays 371 and 1272 move with respect to each other. In fact, it is this motion that guides the adjustment itself.

In FIG. 12B, adjustment is complete. Rays 371 and 1272 coincide. Also, in this embodiment, there are only four rays exiting reflector 1100.

Figures 13, 14:
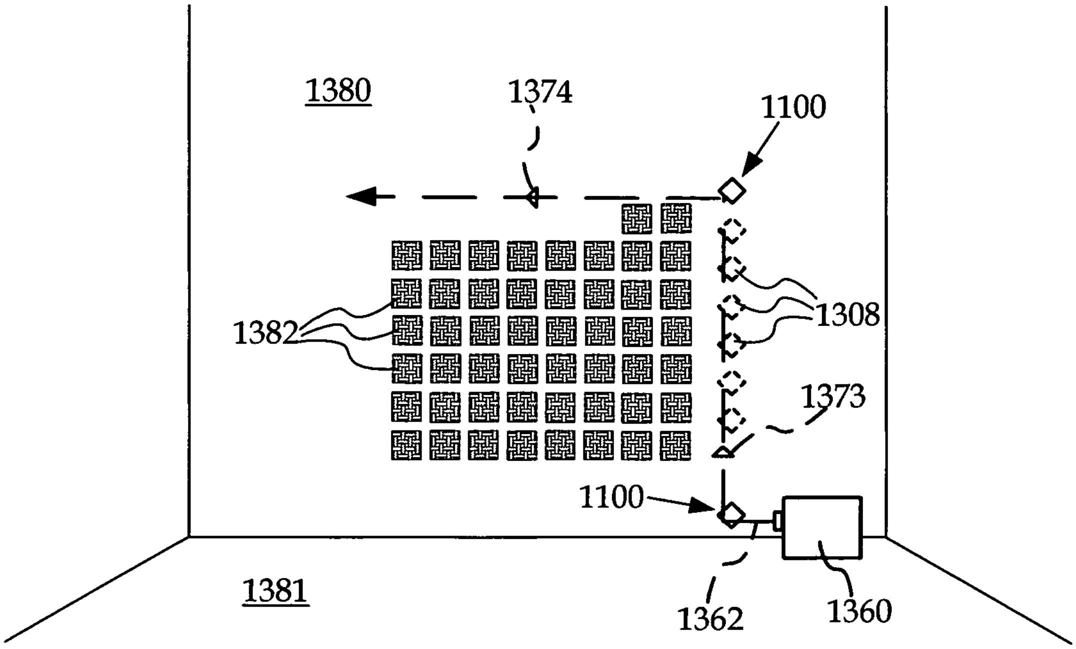
FIG. 13 is a diagram illustrating how different aligning rays can be generated by the invention for implementing the project of FIG. 2, without needing to attach and unattach a heavy laser light source on the wall a number of times.
FIG. 14 is a flowchart illustrating a method according to an embodiment of the present invention.

FIG. 13 is a diagram illustrating an application of the invention. A laser light source 1360 is placed on floor 1381, near the bottom of wall 1380. Importantly, laser light source 1360 need not be attached to wall 1380, or even be the type that attaches to a wall.

Source 1360 emits a level wall beam 1362. A first wall reflector 1100 is attached to wall 1380, and provides a reflected ray 1373 in a vertical direction. A second wall reflector 1100 provides reflected ray 1374 in a horizontal direction, but at a different height than ray 1362.

Figure 1:
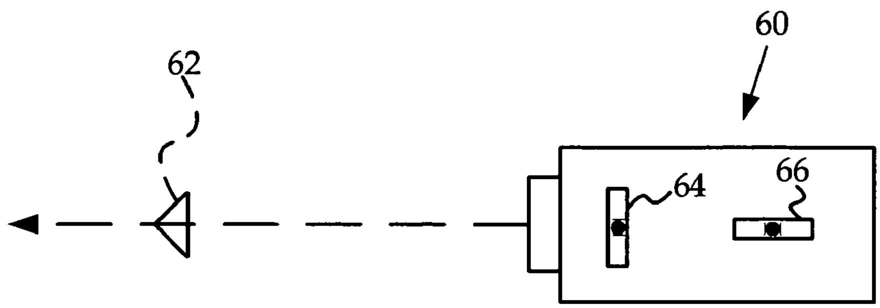
FIG. 1 is a diagram of a laser light source in the prior art.
Figure 2:
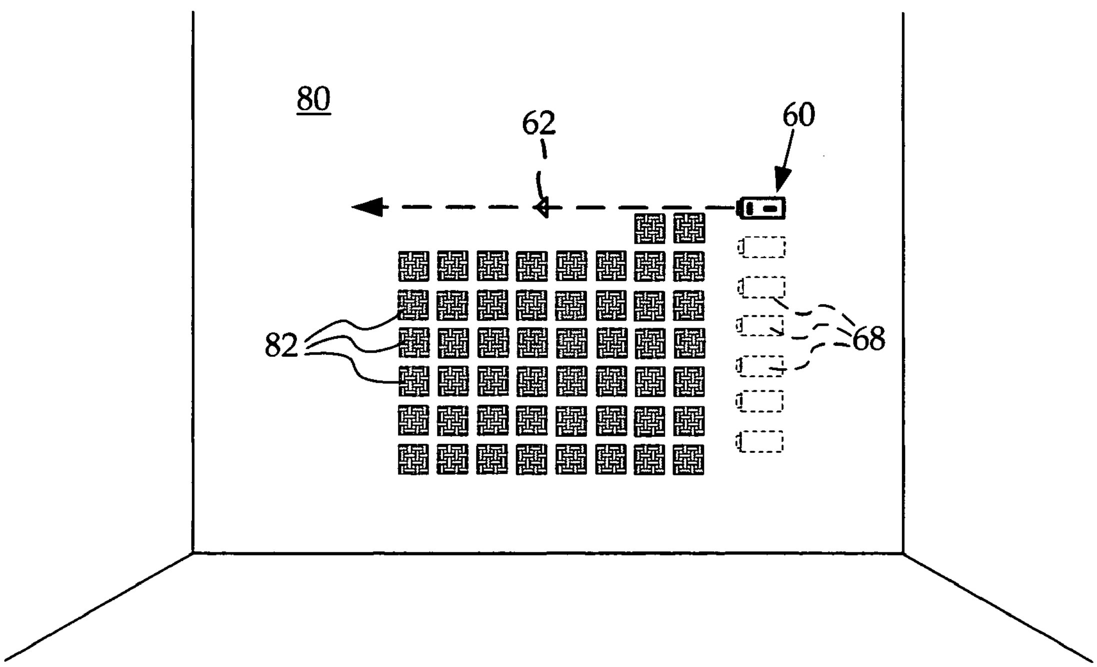
FIG. 2 is a diagram illustrating how the laser light source of FIG. 1 is intended to be attached to and unattached from a single wall multiple times for a single project.

It will be recognized that this is a similar tile laying application as in FIG. 2. The second wall reflector 1100 can be moved to different places 1308 for each new row of tiles 1382, without needing to move laser device 1360. Indeed, all that needs to be moved is second wall reflector 1100, which is lighter than laser device 1360, and can be moved by relocating a pushpin or other attachment means.

Referring now to FIG. 14, a flowchart 1400 is used to illustrate a method according to an embodiment of the invention. The method of flowchart 1400 may also be practiced using the devices described herein.

According to a box 1410, a laser light source is situated such that it emits a beam parallel to a surface of a wall. Situating may be performed in a number of ways. For example, the laser light source may be placed on the floor so that it emits a beam parallel to the wall. Alternately, the laser light source may be attached to the wall.

According to a next box 1420, a first device such as a wall reflector is attached on the wall, in the way of the beam. Accordingly, a reflected ray is derived from the beam, and also possibly a transmitted ray. Attaching may be performed in a number of ways. For example, an adhesive strip may be adhered to the wall. Or the device may be supported at a support location on a support member inserted in the wall surface. In one embodiment, the support location is a support opening, and attaching includes receiving the support member through the opening.

According to an optional next box 1430, the first device is adjusted. Adjusting may be so that the ray is aligned with the vertical or the horizontal. In such an alignment, the ray may become substantially perpendicular to the beam. In another embodiment, adjusting the first device is such that a single ray exits towards a single direction, as was seen in FIG. 12B.

According to an optional next box 1440, a second device is attached to the wall such that it receives and redirects the ray. With more such devices, a pattern may be formed, such as a grid of intersecting rays.

According to an optional next box 1450, an item is attached on the wall as guided by the ray.

A person skilled in the art will be able to practice the present invention in view of the description present in this document, which is to be taken as a whole. Numerous details have been set forth in order to provide a more thorough understanding of the invention. In other instances, well-known features have not been described in detail in order not to obscure unnecessarily the invention.

While the invention has been disclosed in its preferred form, the specific embodiments as disclosed and illustrated herein are not to be considered in a limiting sense. Indeed, it should be readily apparent to those skilled in the art in view of the present description that the invention may be modified in numerous ways. The inventor regards the subject matter of the invention to include all combinations and subcombinations of the various elements, features, functions and/or properties disclosed herein.

The following claims define certain combinations and subcombinations, which are regarded as novel and non-obvious. Additional claims for other combinations and subcombinations of features, functions, elements and/or properties may be presented in this or a related document.

What is claimed is:

1. A device comprising:

a structure suitable for attachment on a surface of a substantially vertical wall, the structure including a redirecting member that includes a substantially flat, laser light reflecting, redirecting surface, wherein when the structure is attached on the wall surface in the way of a laser beam that is traveling substantially parallel to the wall and has been generated independently of the structure, a laser ray may be reflected at least partially from the redirecting surface towards a direction that is substantially parallel to the wall.

2. The device of claim 1, in which the laser ray is reflected from the redirecting surface towards a direction that is further substantially perpendicular to a direction of the beam.

3. The device of claim 1, in which when the structure is attached on the wall surface, a plane of the redirecting surface is substantially perpendicular to a plane of the wall surface.

4. The device of claim 1, further comprising:

attachment means for attaching the structure to the wall.

5. The device of claim 4, in which the attachment means includes an adhesive strip.

6. The device of claim 1, in which the structure further includes an exit member that is substantially identical to the redirecting member.

7. The device of claim 6, in which the structure further includes a connector for coupling the redirecting member with the exit member.

8. The device of claim 1, in which the structure defines a support location, and the structure may be attached to the wall surface by being supported at the support location on a support member at least partially inserted in the wall surface.

9. The device of claim 8, in which the support member includes one of a nail, a pin, a pushpin, and a thumbtack.

10. The device of claim 8, in which when the structure is supported at the support location, a plane of the redirecting surface is oriented at approximately 45° from a vertical plane.

11. The device of claim 8, in which the structure includes an exit member that is substantially identical to the redirecting member, and the support location is defined at an inside corner where the redirecting member meets the exit member.

12. The device of claim 8, in which the support location is a support opening.

13. The device of claim 1, further comprising:

a level coupled to structure.

14. The device of claim 1, in which the redirecting member is adapted to also transmit incident laser light at least partially.

15. The device of claim 14, in which the redirecting member is made from one of glass and plastic.

16. The device of claim 14, in which the structure further includes a guiding member including a substantially flat reflective guiding surface for receiving and reflecting back laser light transmitted through the redirecting surface.

17. The device of claim 16, in which a plane of the guiding surface is approximately 45° from a plane of the redirecting surface.

18. The device of claim 14, in which the structure further includes an exit member adapted to transmit at least partially laser light transmitted through the redirecting member.

19. The device of claim 18, in which the exit member defines an exit surface with a plane substantially perpendicular to a plane of the redirecting surface.

20. The device of claim 19, in which the exit surface is adapted to also reflect incident laser light at least partially.

21. A device for reflecting a laser beam that is traveling substantially parallel to a surface of a wall and has been generated independently of the device, comprising:

means for attaching on the wall in the way of the beam, and means for reflecting the beam into a ray substantially parallel to the wall surface.

22. The device of claim 21, in which one of the beam and the ray is aligned with the vertical, and the other one of the beam and the ray is aligned with the horizontal.

23. The device of claim 21, in which the attachment means includes an adhesive strip.

24. The device of claim 21, in which the attachment means includes a support location to be used in conjunction with a support member at least partially inserted into the wall surface.

25. The device of claim 24, in which the support member includes one of a nail, a pin, a pushpin, and a thumbtack.

26. The device of claim 24, in which the support location includes a support opening.

27. The device of claim 21, further comprising: means for leveling with respect to one of the vertical and the horizontal.

28. The device of claim 27, in which the leveling means includes a guiding surface.

29. The device of claim 27, in which the leveling means includes a level.

30. A method comprising:

situating a laser light source such that it emits a beam substantially parallel to a surface of a wall;

attaching on the wall and in the way of the beam a first device distinct from the source such that a reflected ray is derived from the beam by reflection from the first device; and attaching an item on the wall as guided by the ray.

31. The method of claim 30, in which one of the beam and the ray is aligned with the vertical, and the other one of the beam and the ray is aligned with the horizontal.

32. The method of claim 30, wherein situating is performed by placing the laser light source on the floor.

33. The method of claim 30, wherein attaching the first device includes adhering an adhesive strip to the wall.

34. The method of claim 30, in which attaching the first device includes supporting the first device at a support location on a support member at least partially inserted in the wall surface.

35. The method of claim 34, in which the support member includes one of a nail, a pin, a pushpin, and a thumbtack.

36. The method of claim 34, in which the support location is a support opening, and attaching includes receiving the support member through the opening.

37. The method of claim 30, further comprising: adjusting the first device so that the ray is aligned with one of the vertical and the horizontal.

38. The method of claim 30, further comprising: adjusting the first device so that a single ray exits towards a single direction.

39. The method of claim 30, further comprising: attaching to the wall a second device such that it receives and redirects the ray.

* * * * *